United States Patent [19]

Okamura et al.

[11] 4,404,572

[45] Sep. 13, 1983

[54] RECORDING APPARATUS

[75] Inventors: Shigeru Okamura, Yokohama; Hiroshi Kyogoku, Kawasaki; Shigemitsu Tazaki, Matsudo, all of Japan

[73] Assignee: Canon Kabushiki Kaisha, Tokyo, Japan

[21] Appl. No.: 114,202

[22] Filed: Jan. 22, 1980

[30] Foreign Application Priority Data

Jan. 31, 1979 [JP] Japan .................................. 54/10181
Feb. 21, 1979 [JP] Japan .................................. 54/19227

[51] Int. Cl.3 ...................... G01D 15/16; G01D 15/24
[52] U.S. Cl. .................................. 346/140 R; 346/75
[58] Field of Search ................ 346/139 R, 75, 139 A, 346/139 B, 139 C, 139 D, 140 R, 140 A, 141–143; 318/687, 640, 616; 310/13; 400/126, 322

[56] References Cited

U.S. PATENT DOCUMENTS

| | | | |
|---|---|---|---|
| 3,708,681 | 1/1973 | Ivers | 318/640 X |
| 3,899,699 | 8/1975 | Griffing | 310/13 |
| 4,012,676 | 3/1977 | Giebler | 318/687 X |
| 4,106,029 | 8/1978 | Albarda et al. | 346/139 R X |
| 4,183,030 | 1/1980 | Kaieda | 346/140 |
| 4,219,765 | 8/1980 | Morsing | 318/616 X |

FOREIGN PATENT DOCUMENTS 2725727 12/1977 Fed. Rep. of Germany ...... 346/140 PD

*Primary Examiner*—G. Z. Rubinson
*Assistant Examiner*—W. J. Brady
*Attorney, Agent, or Firm*—Fitzpatrick, Cella, Harper & Scinto

[57] ABSTRACT

Ink jet recording apparatus includes a guide member provided in parallel to a transversal direction of a recording sheet, a carriage having a recording head and adapted to move on the guide, a signal generator provided in parallel to the guide, and a control unit for causing the signal generator to detect position and speed of the carriage.

10 Claims, 18 Drawing Figures

RECORDING APPARATUS

BACKGROUND OF THE INVENTION

1. Field of the Invention

The present invention relates to recording apparatus for use in electronic apparatus, and more particularly to ink jet recording apparatus of a small and simple structure.

2. Description of the Prior Art

The conventional ink jet recording apparatus are generally large in size and have not been realized in a dimension allowing the use thereof in small electronic calculators.

For the purpose of reducing the dimension, there was proposed, as disclosed in the U.S. Pat. Nos. 3,899,699 and 4,012,676, the use of a linear motor for displacing the recording head. Such structure is inevitably complex and separate means are required for detecting the position and speed of the recording head. Also no improvement in the recording speed has been achieved with such structure.

SUMMARY OF THE INVENTION

The principal object of the present invention is to provide recording apparatus of a particularly small and simplified structure.

Another object of the present invention is to provide a simplified mechanism for detecting the position and speed of the recording head.

Still another object of the present invention is to provide an improved recording speed.

BRIEF DESCRIPTION OF THE DRAWINGS

FIGS. 6A, 6B-1 and 6B-2 are waveform charts useful in understanding the printing operations;

DESCRIPTION OF THE PREFERRED EMBODIMENTS

Figure 1:
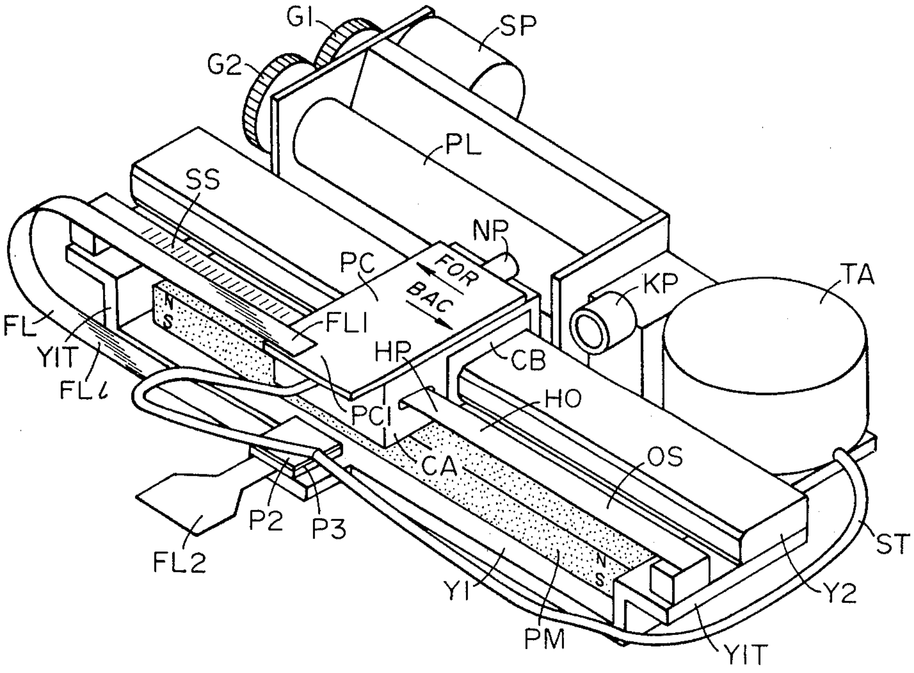
FIG. 1 is a perspective view of an embodiment of the recording apparatus in accordance with the present invention.

In the following there will be given an explanation on an embodiment of the recording apparatus in accordance with the present invention shown in FIGS. 1 and 2, wherein the latter being the cross-sectional view of the apparatus shown in FIG. 1. In the apparatus a carriage CA having a recording head such as an ink jet nozzle NP is displaced by means of a linear motor.

The linear motor is provided with a closed magnetic circuit composed of a permanent magnet PM, a magnetic plate Y1 and a magnetic slide rail Y2. A current is supplied to a coil C wound on a coil bobbin CB slidably provided on slide rail Y2 to drive carriage CA integral with coil bobbin CB by means of Flemmings' left-hand rule. A reciprocating motion of the carriage on the slide rail is achievable by changing the direction of the current supplied to coil C. A signal generating board, composed for example of non-magnetic slit board OS, is horizontally mounted, at both ends thereof and parallel to slide rail Y2, on end folded portions Y1T of magnetic plate Y1, on which slide rail Y2 is also mounted. The carriage CA is provided, in addition to coil bobbin CB and the ink jet nozzle NP, with slit detecting means for example a light-emitting diode LE, a phototransistor PT and a printed circuit board PC fixed with adhesive materials EP1 and EP2. Printed circuit board PC is electrically and mechanically connected to the related terminals C1 and C2 of the coil C, those PZ1, PZ2 of a piezoelectric element PZ for driving the ink jet nozzle NP, those LE1, LE2 of the light-emitting diode LE and those PT1, PT2 of the phototransistor PT. All these wires are connected, at an end portion PC1 of printed circuit board PC, with an end FL1 of a flexible cable FL, and the connecting portion is secured by a fixing plate P1. Flexible cable FL is folded back and fixed by a cable fixing plate P3 which is secured together with a fixing plate P2 by a screw S at a position where an ink supply tube ST for supplying the ink from a tank TA is fixed. The other end FL2 of flexible cable FL is connected to a connector CN shown in FIG. 2, whereby the carriage CA and the piezoelectric device PZ of the ink jet nozzle NP are controlled through the signal lines of flexible cable FL. The slit page OS is positioned between light-emitting diode LE and the phototransistor PT, whereby the infrared light emitted by the light-emitting diode LE is intermittently received, along with the displacement of the carriage CA, through the slits SS and by an entrance slit (not shown) of the same shape provided on the phototransistor PT to generate timing pulses TP, by means of which the speed and position of the carriage CA during the scanning motion are detected to control the speed, the ink jet nozzle and a paper-feed stepping motor SP. When printing a line of characters, the characters are formed in a dot matrix configuration. In response to a print instruction signal, the carriage initiates the scanning motion, and at determined positions detected by the timing pulses TP the piezoelectric device PZ is energized to shoot ink droplets from the ink jet nozzle to perform the printing of a dot line on recording paper (not shown). Upon completion of the printing of a dot line, the paper-feed stepping motor SP is rotated by a dot pitch and the carriage CA is simultaneously returned to the original position for printing. The paper feeding is achieved by reducing the rotation of the stepping motor SP through gears (not shown) on the motor shaft and gears G1 and G2. The latter gear G2 is mounted on the shaft of a platen PL to perform advancement of the recording paper by a determined amount. Upon completion of a determined number of dot-line printing mentioned above (for example 7 dot lines in the case of $5\times7$-dot matrix characters), the platen PL is rotated by the stepping motor SP by an amount corresponding to the space between the lines, thus completing the printing of a line of characters. Thereafter the ink jet nozzle NP is displaced to a position HO of a cap KP, thus preventing the clogging, drying and meniscus retraction in the ink jet nozzle.

The apparatus of the present embodiment can be realized with a small, flat and simple structure without disturbing the magnetic field since the carriage slide rail and the non magnetic signal generating board are positioned along the permanent magnet plate as explained in the foregoing.

Also the apparatus is significantly quiet since the carriage drive is achieved without the rotary motor and the associated mechanisms such as gears, links, racks etc., and the paper feeding is achieved by a stepping motor instead of ratchets, plungers, etc.

Besides the sliding motion of the carriage on the signal generating board eliminates the ink undesirably deposited thereon, thus avoiding the inability of the detecting means composed of a light emitting device and a photodetector.

Furthermore the structure of the carriage with a printed circuit board incorporating various electric components allows simplicity and inexpense in manufacture, and the use of a flexible cable allows the carriage to be displaced freely. In addition the cable may be secured at a point together with the ink supply tube to achieve a simpler assembly.

Figure 3:
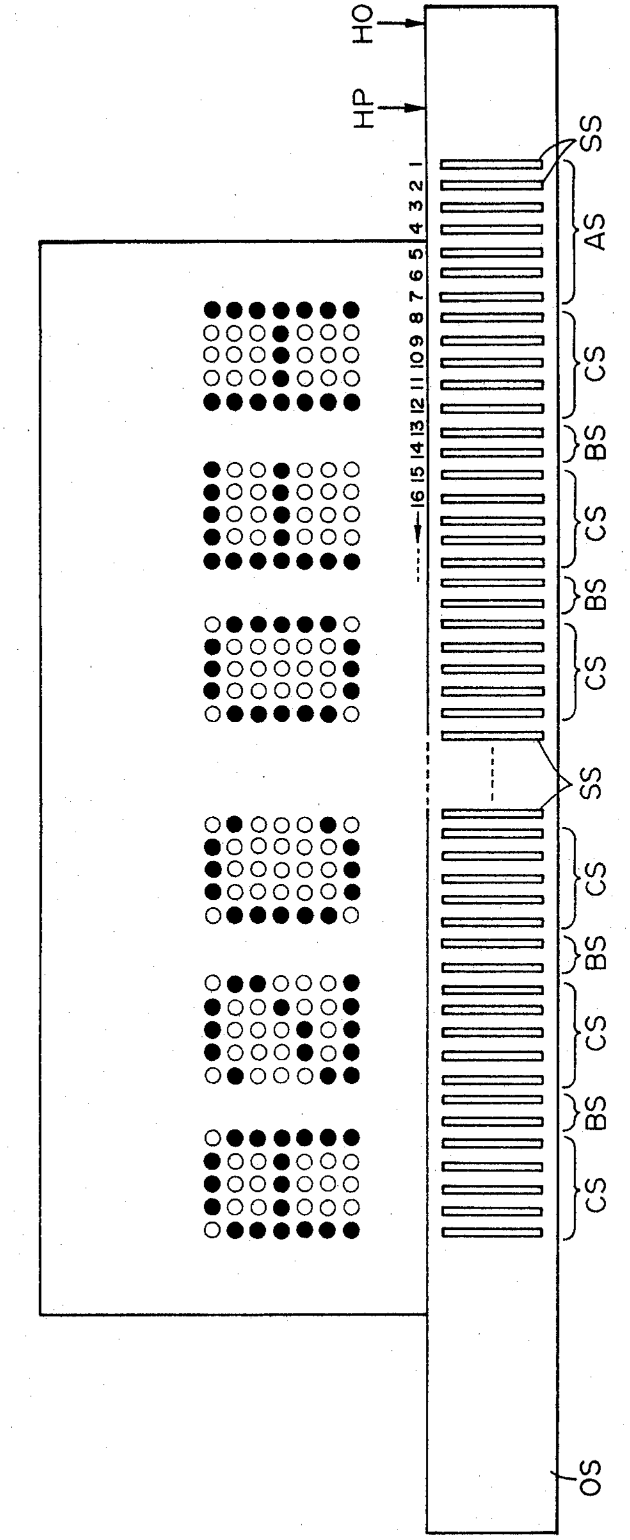
FIG. 3 is an enlarged view of a signal generating board of the apparatus.

In the present embodiment the slit plate OS is provided with slits SS as shown in FIG. 3 for achieving the position control and the constant speed control.

Slits SS are provided over a length in excess of the width of the printing paper P, and the speed adjustment of the carriage CA is completed during the counting of eight slits after the start of displacement thereof from the initial position HP or HO. The printing of a first character is performed over five slits from 8th to 12th, while succeeding two slits from 13th to 14th are utilized for forming a blank with respect to a succeeding character, and this procedure will be repeated. In FIG. 3, AS, CS and BS respectively represent the approach slits for detecting the print start position, the character slits and the blank slits, and the carriage speed is controlled at a constant value by these slits and the spacing thereof.

Figure 2:
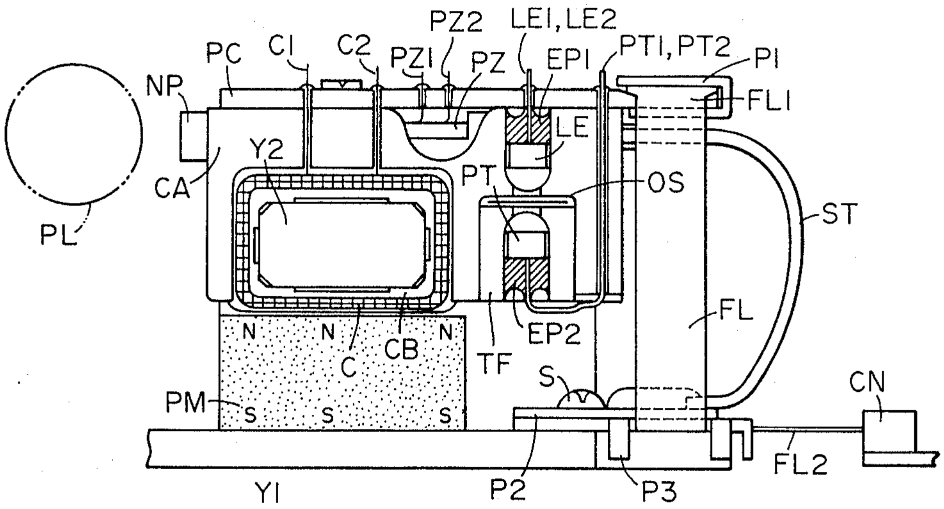
FIG. 2 is a cross-sectional view of the apparatus shown in FIG. 1.
Figure 4:
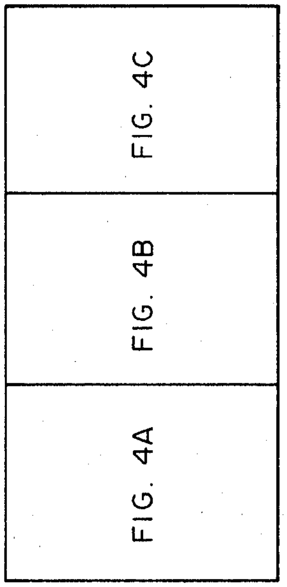
FIGS. 4A, 4B and 4C, when combined as shown in FIG. 4, are a schematic block diagram of an embodiment of the control block of the apparatus.
Figure 4A:
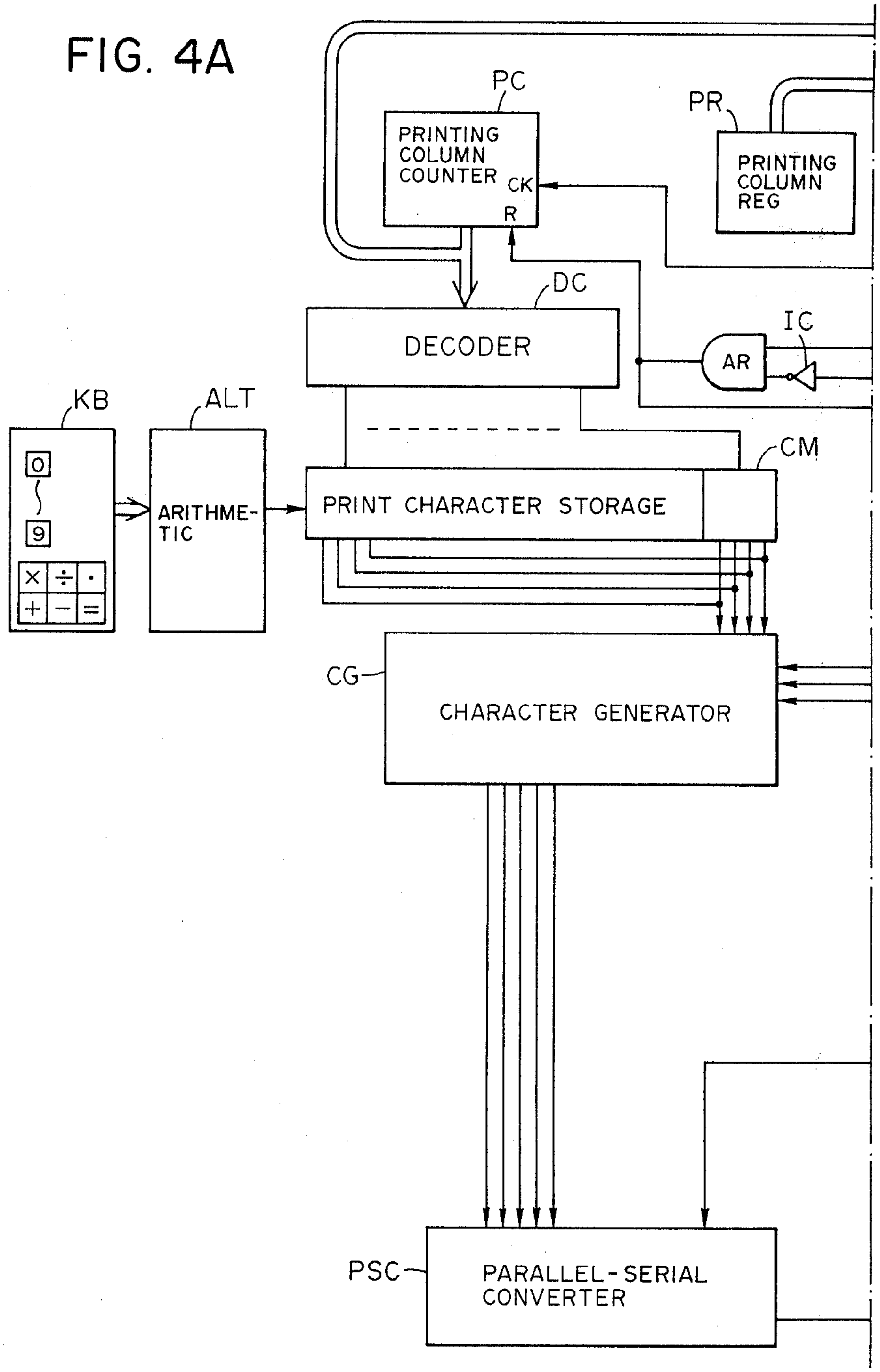
Figure 4B:
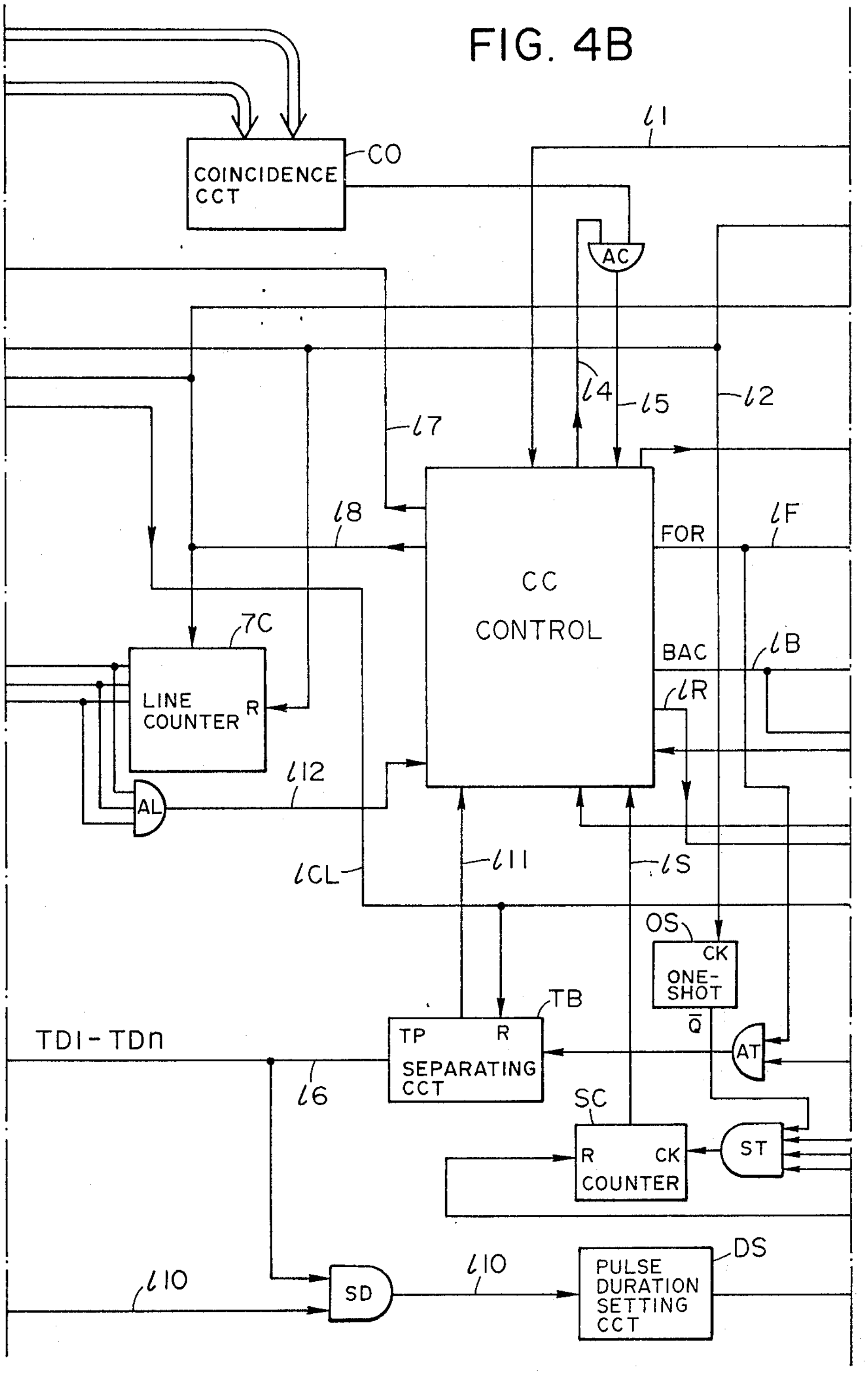
Figure 4C:
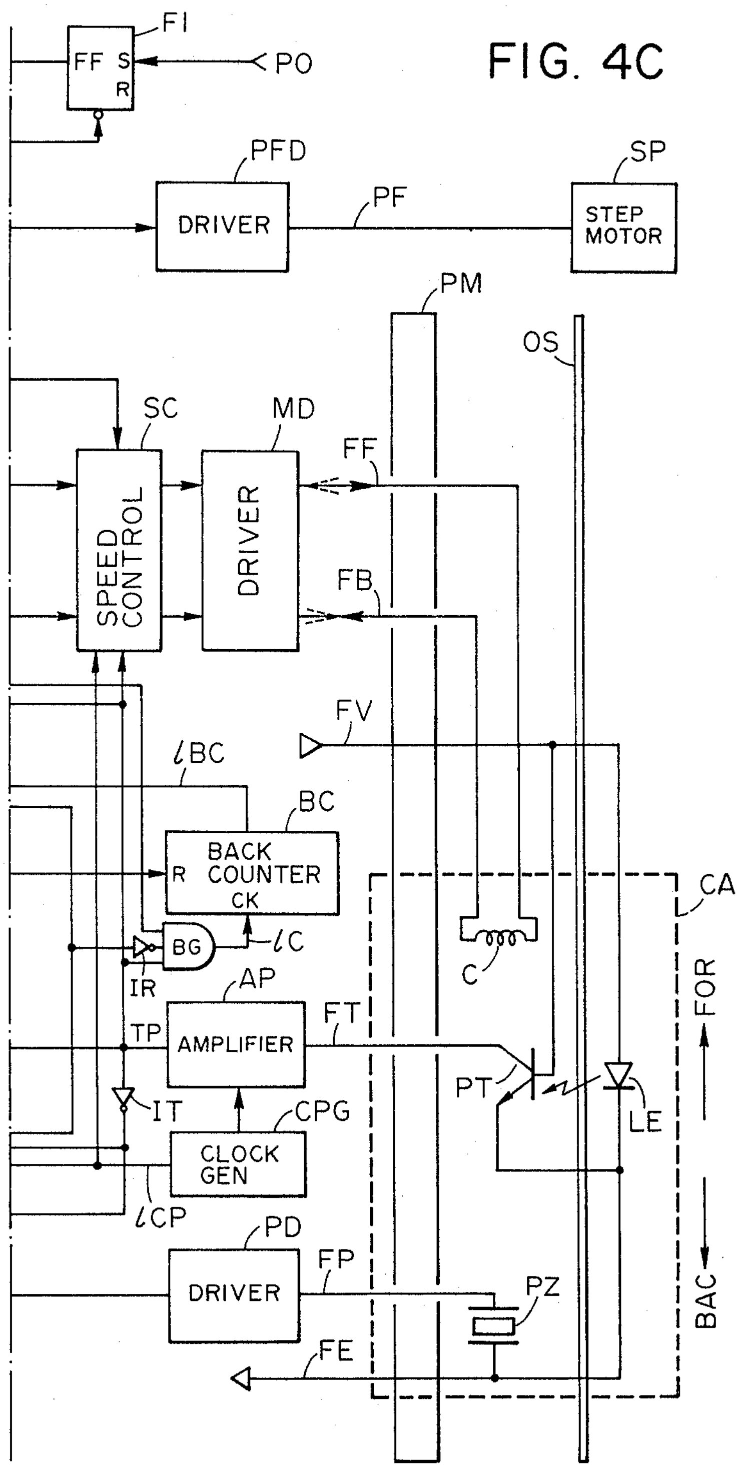

FIG. 4 shows an example of the control circuit for the above-explained apparatus, wherein the lead wires FF, FB, FV, FT, FP and FE are integrally formed as the wires FLl of the flexible cable FL shown in FIG. 1, thereby facilitating the displacement of the carriage CA. Upon turning on of the power supply, a control CC maintains a signal line l2 at the level 0 for a determined period to reset a flip-flop F1, thereby clearing a printing column counter PC, a line counter 7C, a timing pulse separating circuit CB and a back counter BC and starting a one-shot multivibrator OS through a gate AR and supplies a level "1" signal over a signal line lR to a gate ST.

Also in order to displace the carriage CA to the home position HO (FIG. 5) signals of level "0" and level "1" are respectively supplied to the signal lines lF and lB for driving the coil C thereby causing the backward motion of the carriage CA.

Figure 5:
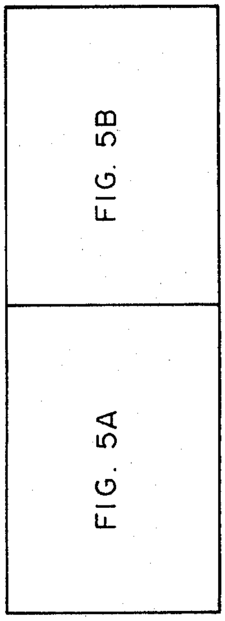
FIGS. 5A and 5B, when combined as shown in FIG. 5, depict waveforms useful for understanding the operations of the initial position setting.
Figure 5A:
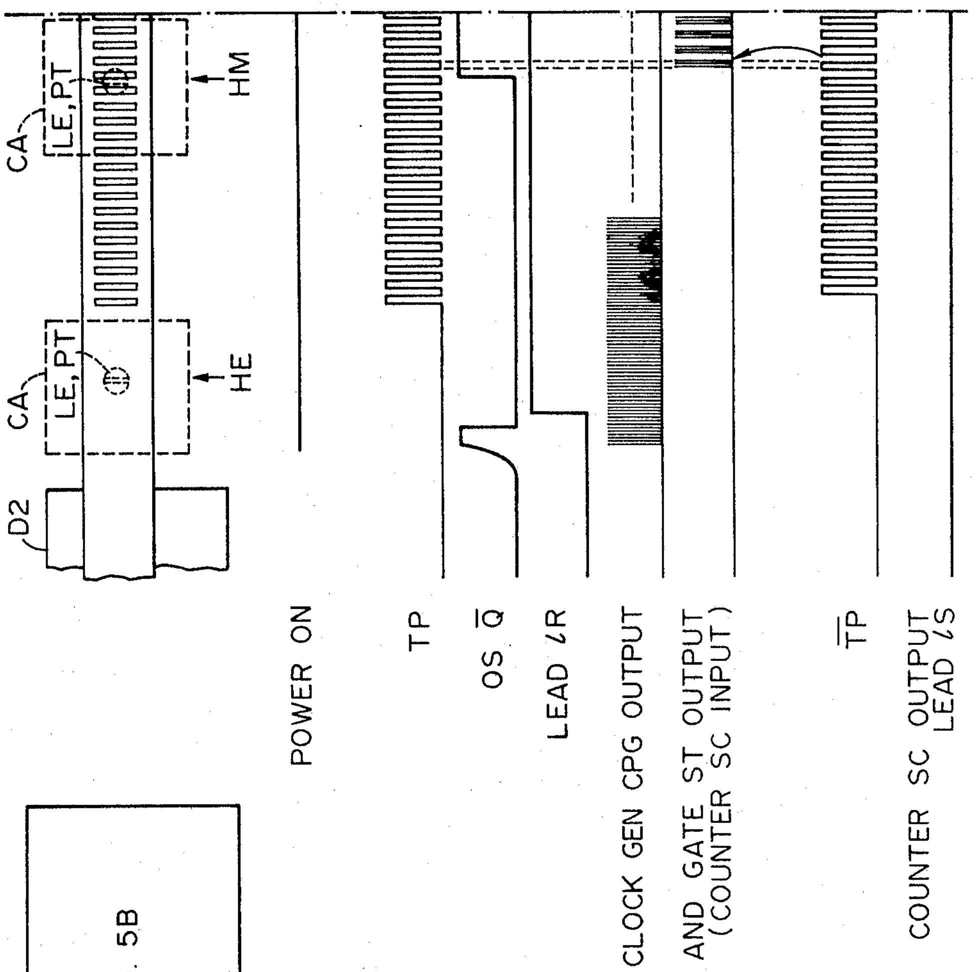
Figure 5B:
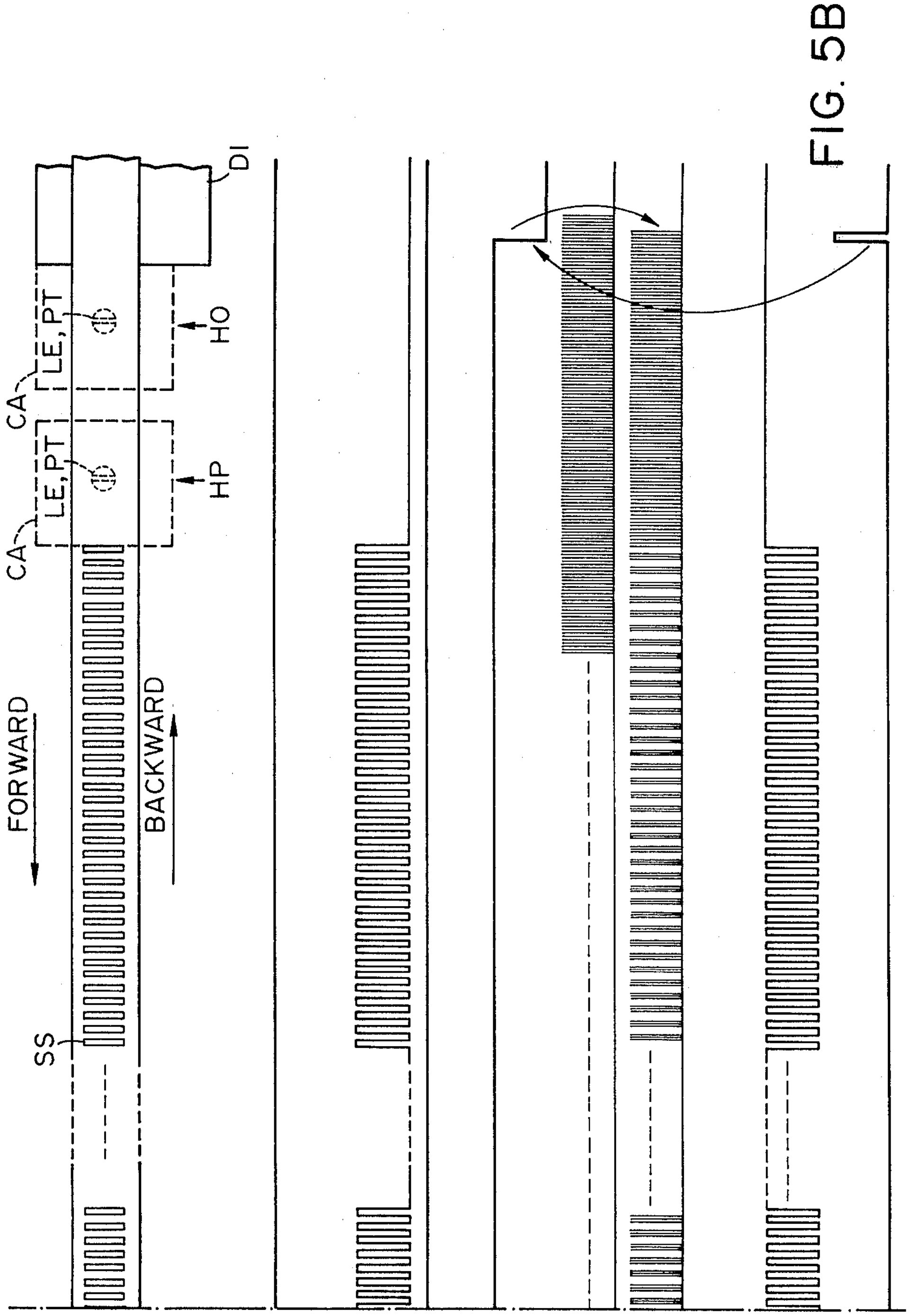

The activated time of one-shot multivibrator OS is selected so as to enable the displacement of the carriage CA for example to a position HM shown in FIG. 5 even when it is initially located at the left end position.

In case the coil is energized when the carriage is at a position HE shown in FIG. 5, the light transmitted through slits SS generates timing pulses TP on a signal line lT through an amplifier AP shown in FIG. 4. The inverted pulses $\overline{TP}$ obtained through an inverter IT are supplied to the gate ST. However the gate ST is closed during the predetermined period of the one-shot multivibrator OS, so that timing pulses TP and the output signal of a clock generator CPG are not supplied to the counter SC during the period. During the period the carriage displaced from the position HE to the position HM, and, thereafter, the output signal of clock generator CPG is supplied to counter SC only during the pulses $\overline{TP}$.

Figure 6A:
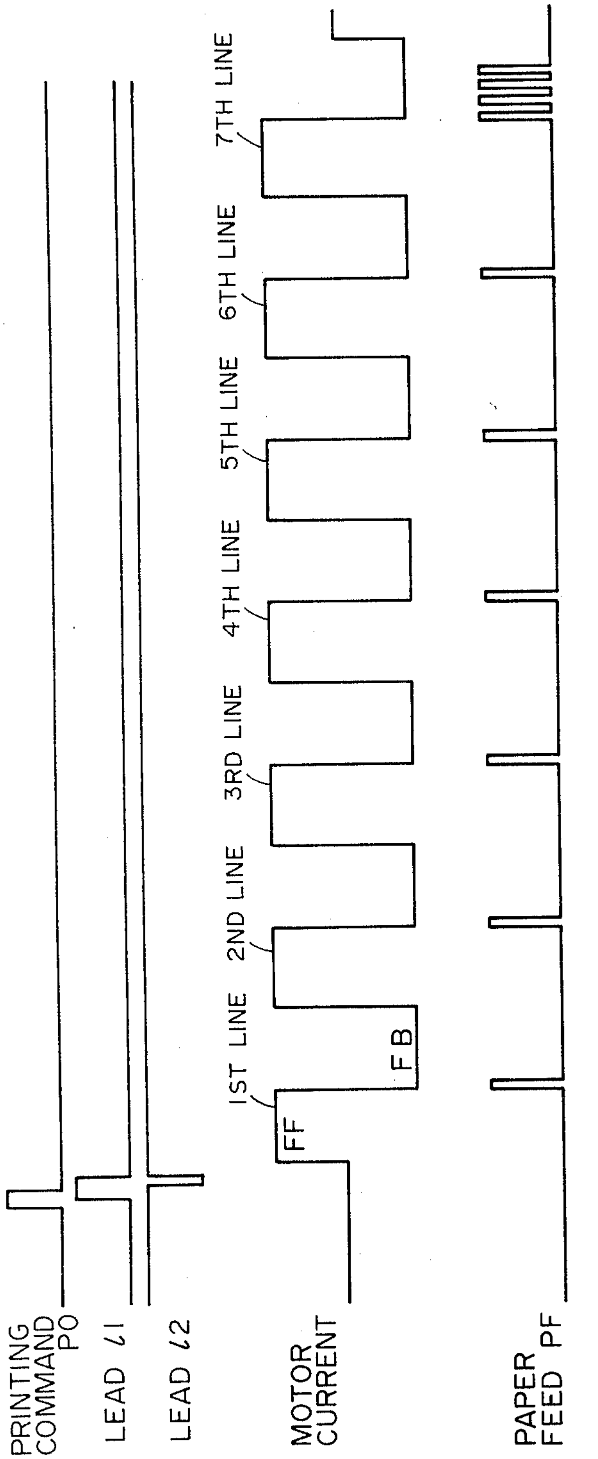

However, when the carriage CA passes through a translucent slit SS of the slit plate OS, the counter SC releases no output signals as it is reset by the trailing edge of the signal $\overline{TP}$. The counter SC is so designed as to have a full count sufficiently larger than the number of input pulses from the clock generator CPG during the passage of translucent slits and also sufficiently larger than, for example approximately one and a half times of, the time period required for the displacement of the carriage to the position HO, so that the counter SC develops an output signal on a signal line lS after the lapse of a determined period of time subsequent to the displacement of the carriage through the translucent slits to the position HO. Identifying the displacement of the carriage to the intial position by the signal, the control CC changes the coil driving line lB to level "0" to terminate the displacement of the carriage and also changes the signal line lR to level "0" to close the gate ST. Also an AND gate BG receives a level "1" signal through an inverter IR. As shown in FIG. 5 there are provided shock-absorbing members D1, D2, composed for example of a foamed material, in order to reduce the shock and noise of the carriage collision. The information to be printed is supplied from a keyboard KB through an arithmetic ALT to a print character storage CM. In response to a print command signal PO shown in FIG. 6A, a flip-flop F1 is set to produce a signal on the set output signal line l1, in response to which the control CC is shifted to the print mode of operation to maintain the signal line l2 at the level "0" for a determined period thereby resetting flip-flop F1 and clearing the print column counter PC, the line counter 7C, the back counter BC and the timing pulse separating circuit TB through the gate AR.

Simultaneously the one-shot multivibrator OS is also activated, but the counter SC is not affected as the signal line lR is maintained at the level "0" to close the gate ST. It is to be noted, however, that the gate BG is maintained open through the inverter IR. After the execution of the above-mentioned clearing and resetting, the control CC shifts the signal line l4 to level "1" to open a gate AC, whereby the contents of the printing column counter PC (hereinafter referred simply to as a column counter) and of a printing column register PR (hereinafter referred simply to as column register) are supplied through a coincidence circuit CO, the gate AC and a signal line l5 to the control CC. In case of absence of coincidence, the control produces a level "1" signal over a signal line lF to activate the coil C through a driver MD, thereby causing a forward motion of the carriage CA.

For example in case column counter PC and the column register PR respectively store numbers "0" and "n", the coincidence circuit CO develops a signal indicating the absence of coincidence, in response to which the control CC performs the above-mentioned drive control.

Figure 6B:
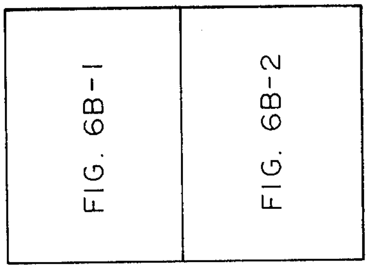
Figures 1, 6B:
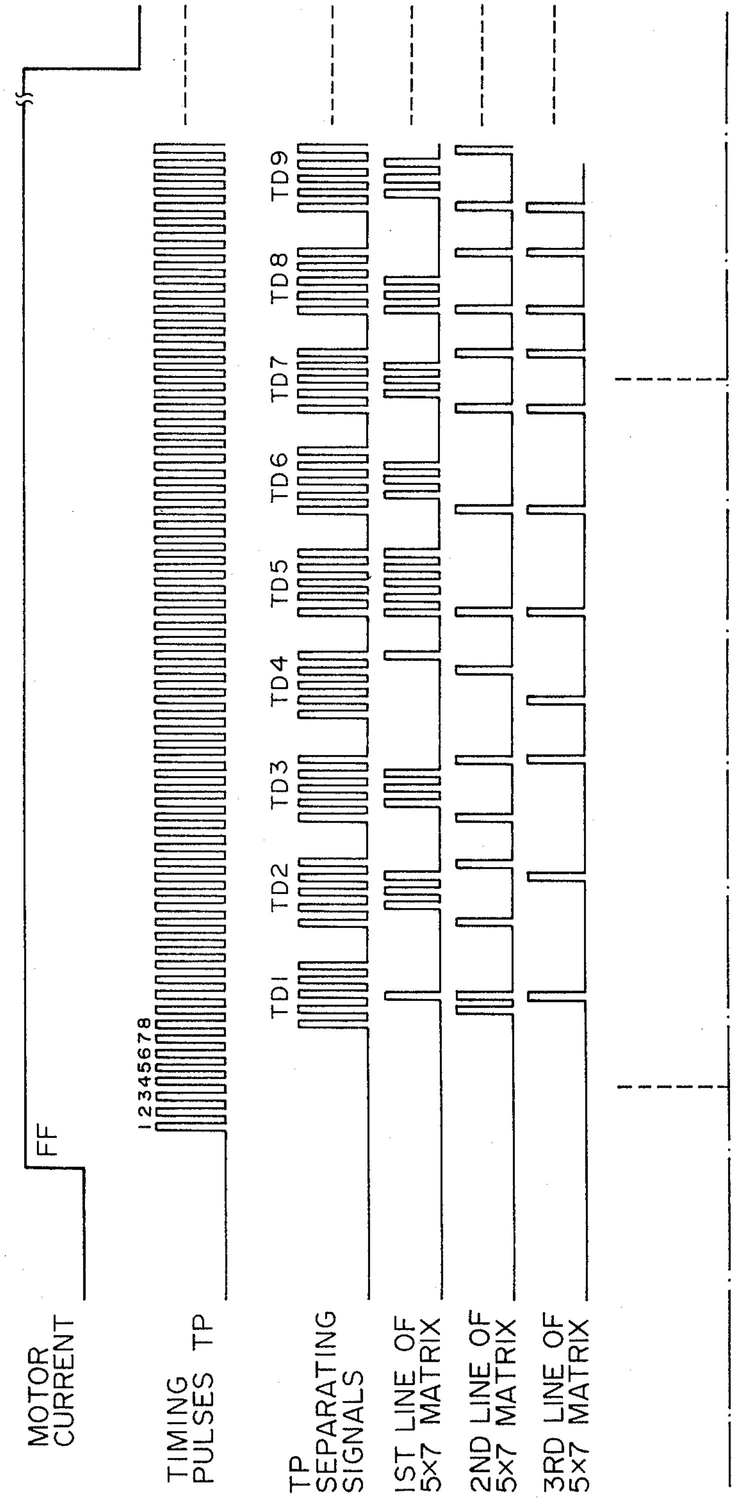
Figures 2, 6B:
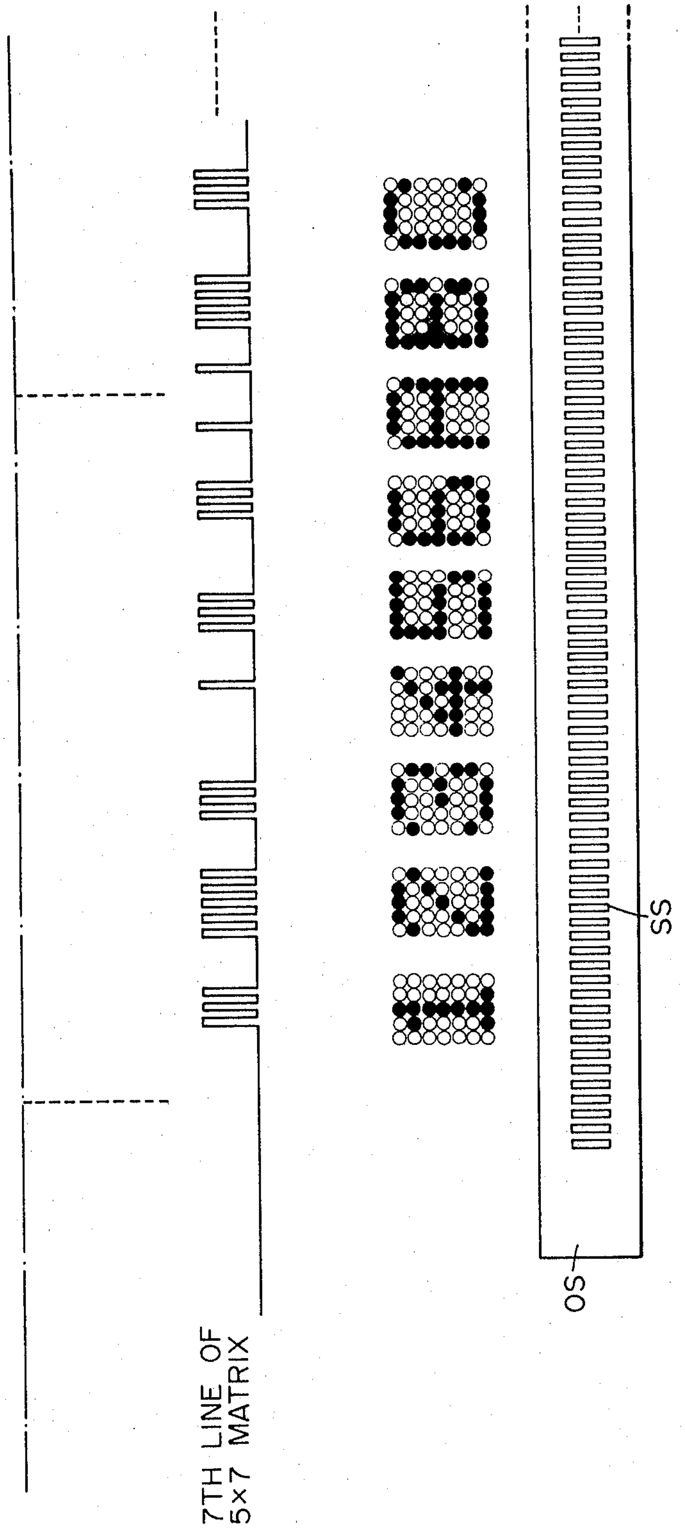

Simultaneously with the forward motion of the carriage CA the detecting means LE and PT are displaced along the slit plate OS to generate timing pulses through the amplifier AP. Timing pulses TP are supplied through a gate AT maintained open by a level "1" signal on a signal line lF and separated by the separating circuit TB into 5-pulse groups TD1–TDn each for printing a character as shown in FIG. 6B, of which the group TD1 is at first supplied to a parallel-serial converter PSC and a gate SD through a signal line l6.

The total number of characters to be printed in a line is in advance stored in the column register PR while the column to be printed is counted by the column counter PC of which an output signal is supplied to a decoder DC for selecting the content of the print character memory CM.

The content thus selected is supplied under the control of the line counter 7C, as a 5-bit print signal from a character generator CG.

Figure 7:
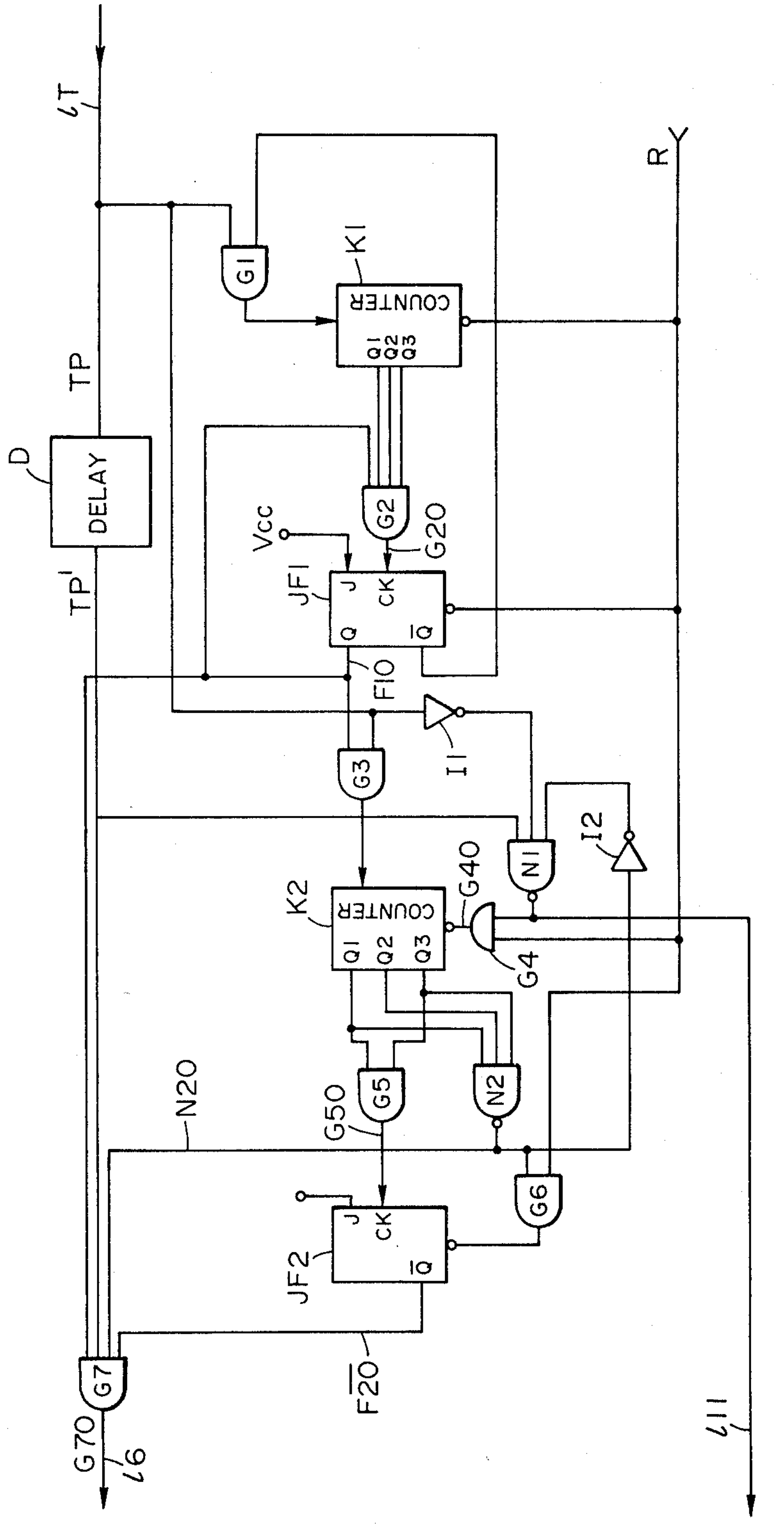
FIG. 7 is a partially detailed circuit diagram of the apparatus.
Figure 8:
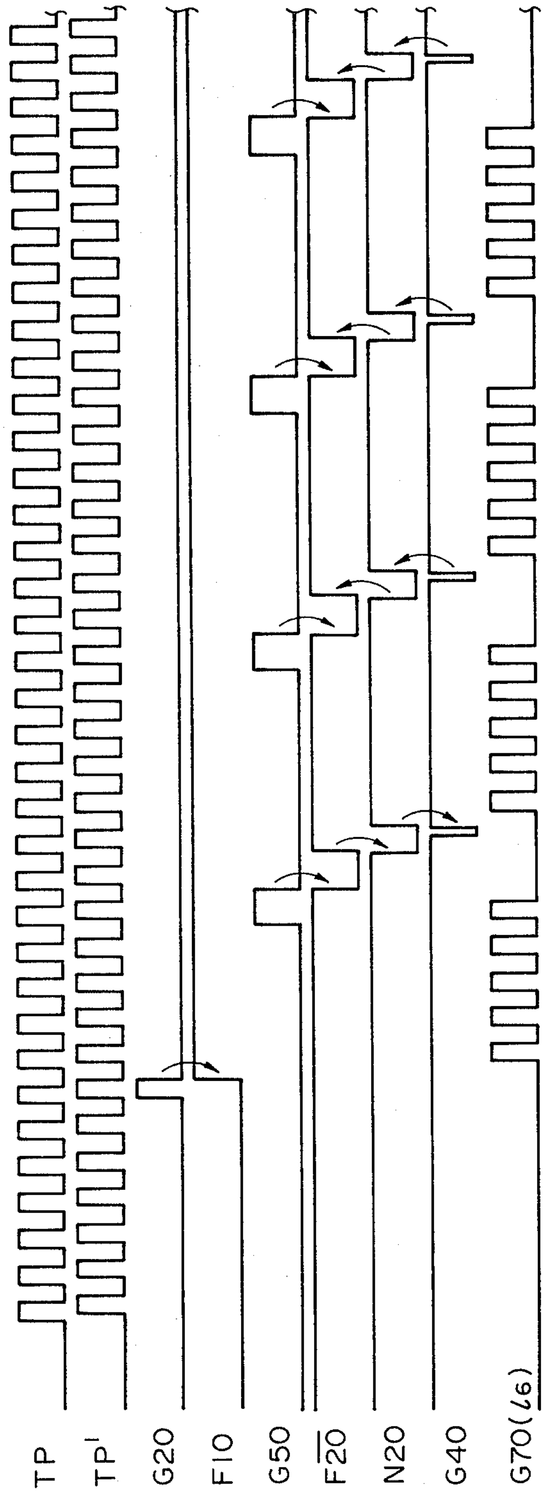
FIG. 8 shows waveforms useful for understanding the operations of the circuit.

The 5-bit print signal is supplied to the parallel-serial converter PSC, of which an output is supplied through a signal line l9, a gate SD to be opened only during the high-level state of the signal TD1 and an output signal line l10 to a pulse duration setting circuit DS. The output pulses therefrom of a constant duration are supplied to a piezo driver PD to energize a piezo device PZ thereby causing an ink droplets to be emitted for each entry of a signal to pulse duration setting circuit DS to perform the character printing. The timing pulse separating circuit TB shown in FIG. 4 is for example composed, as shown in FIG. 7, of a delay circuit D, counters K1, K2, JK, flip-flops JF1, JF2, AND gates G1–G7, NAND gates N1, N2, and inverters I1, I2. It operates as seen from the time chart of FIG. 8 to generate pulse groups TD1–TDn on the output signal line l6.

The foregoing discussion corresponds to the printing of 5 dots in the first line among 7 lines constituting a 5×7-dot matrix of the first column in the first print line of characters. Upon completion of the 5-dot printing of the first line in the first column, the control CC identifies this state through a signal line l11 and develops a signal on line l7 to increment the column counter PC. Thereafter, in a similar manner to the foregoing, the contents of the column register PR and of the column counter PC are supplied through the coincidence circuit CO and the gate AC, which is enabled by the signal line l4, to the signal line l5. In case the control CC identifies the absence of coincidence a character stored in a position of print character storage CM designated by the incremented column counter PC will be printed in response to the 5-pulse group TD2 from separating circuit TB.

The above-explained procedure from the incrementing of the column counter to the memory reading and signal input to the parallel-serial converter can be completed sufficiently prior to the output of the 5-pulse group since the function clock signals of the related circuits are sufficiently faster than the timing pulses. In this manner the selective printings of 5 dots each in the first line of the first character line is performed in succession by the signals TD3, TD4, . . . , TDn. When the content of the column counter PC coincides with that of the column register PR, the control CC identifies the coincidence through the signal line l5 upon opening of the gate AC through the signal line l4 and produces a level "1" signal to the signal line l8 to activate a paper feed driver PFD thereby conducting paper feeding, simultaneously clearing the column counter PC, separating circuit TB and back counter BC through the gate AR and CC identifies that the printing does not exceed the 7th line from the fact that an AND gate AL representing the logical product of the outputs of line counter 7C does not provide a level "1" signal over the signal line l12.

Thus the control CC changes the signal lines lF and lB respectively to the level "0" and level "1" to cause a backward motion of the carriage CA. In this state wherein the signal lines lR and lB are respectively at the level "0" and level "1", the gate BG is opened to allow the entry of the timing pulses TP into the back counter BC through a signal line lC, whereby back counter BC counts the number of timing pulses corresponding to the slits during the backward motion of the carriage. Upon completion of the counting of all the timing pulses by the back counter BC the control CC identifies through a signal line lBC that the carriage has reached a position outside the slits and changes the signal line lB to the level "0" thereby terminating the backward motion of the carriage CA. The printing operation is not conducted during the backward motion of the carriage as the gate AT remains closed by the level "0" state of the signal line lF to inhibit the entry of timing pulses TP into separating circuit TB.

Subsequently the control CC, identifying through the signal line l12 that the printing of 7th line in the 5×7-dot matrix is not completed, proceeds to the printing of a succeeding line.

Now the line counter 7C is step advanced from "0" to "1" to designate the second line in the character generator CG, whereby the control CC maintains the signals lF and lB respectively at the level "1" and "0" in the same manner as in the printing of the first line to activate the driver MD, to enable the gate AT and to disable the gate BG. The carriage CA which has been moving due to its inertia after the termination of the backward drive is temporarily stopped at the right-end position HP of the slit plate OS in FIG. 5 and then driven in the forward direction whereby the detecting means LE, PT move over the slits SS to generate the timing pulses TP which are divided into 5-pulse groups TD1–TDn by timing pulse separating circuit TB. Also in the same manner as explained in the foregoing, the character generator CG produces the signals in response to a character from the print character storage CM selected by the column counter PC through the decoder DC, but the signals correspond to the data of second line in the 5×7-dot matrix since the line counter 7C stores "1" in this state. Those signals are supplied bit by bit through the parallel-serial converter PSC in response to the 5-pulse group from the timing pulse separating circuit to the pulse duration setting circuit DS which in turn energizes the driver PD for a determined duration to perform the printing of the second line of the first column.

Thereafter the printing of the second line in the 5×7-dot matrix is repeated for all the columns in the same manner as in the printing of the first line.

Then, upon completion of the printing of the second line to be detected by the coincidence circuit CO as explained in the foregoing, the control CC performs the paper feeding through the signal l8, clears the column counter PC, separating circuit TB and back counter BC and increments the line counter 7C. In this state the control CC identifies, from the level "0" state of the output line l12 from the gate AL, that the printing of the seventh line in the 5×7-dot matrix is not yet completed. Then the control CC changes the signal lines lF and lB respectively to the level "0" and the level "1" to reverse the carriage, then deactivating the coil C upon receipt of the signal from the back counter CB indicating that all the timing pulses have been counted and the carriage has thus been returned to a position outside the print slits and initiates the forward drive to temporarily stop the carriage at the position HP located outside the print slits and then to displace the carriage in the forward direction to perform the printing of the succeeding line indicated by the step advanced line counter 7C.

Upon completion of the printing from the third line to the seventh line in the same manner, the control CC advances the paper by one line, clears the column counter PC, separating circuit TB and back counter BC, and increments the line counter 7C.

In this state, in response to the level "1" state of the output line l12 of the gate AL, the control CC identifies the completion of the printing of the seventh line.

Then the control CC identifies the state of the output signal line l1 of the flip-flop F1 to confirm the presence or absence of the succeeding print command for the next row. If the signal line is in its high-level state indicating the presence of such succeeding print command, the control CC changes the signal lines lF and lB respectively to the level "0" and the level "1" to reverse the carriage CA to a position outside the print slits in response to the signals from the back counter BC through the gate BG, in the same manner as in the printing of each line in the 5×7-dot matrix. During this procedure, the paper feed driver PFD is activated three times through the signal line l8 to perform the paper feed operation three times.

Then the control CC causes the information for the succeeding print line of characters to be stored in the print character storage and is shifted to the print mode of operation, wherein the control CC maintains the signal line l2 for a determined duration to reset the flip-flop F1 and to clear through the gate AR the column counter PC, line counter 7C, back counter BC and timing pulse separating circuit TB. Although the one-shot multivibrator OS is also started at the same time, the counter SC is not affected as the gate ST is disabled by the low-level state over the signal line lR.

Subsequently, in the same manner as explained in the foregoing for the printing of the first line of characters, the control CC supplies a level "1" signal to the line l4 to open the gate AC, receives the output signal of the coincidence circuit CO receiving the contents of the column counter PC and of the column register PR through the gate AC, and, in case of the absence of coincidence, performs the printing in the same manner by driving the carriage in the forward direction after a temporary stop at the position HP. In the foregoing procedure, the steps of data storage into the print character storage, clearing of various circuits, identification of the presence or absence of coincidence by the coincidence circuit and start of forward drive of the carriage are completed within a period sufficiently shorter than the time period required for the carriage running. Also the control CC identifies the completion of the printing of a line of characters in response to a high-level signal on the line l12 received from the line counter 7C through the gate AL and indicating the completion of printing of seven lines.

A continuous printing can be achieved by repeating the above-explained procedure.

On the other hand, in case the output signal line l of the flip-flop F1 is at the low-level state the control CC, identifying the absence of a succeeding print command, returns the carriage to the position HO which is also outside the print slits, through a procedure similar to that in the case of the power turning-on.

The stop position of the returned carriage is different in the continuous printing and in the end of printing since the printing time can be shortened if the running time of the carriage outside the print slits can be minimized. For this reason, in the case of continuous printing, the carriage is not returned to position HO but to an advanced stop position HP from which the forward motion for the succeeding printing can be initiated.

It is also possible to return the carriage always to the stop position HP instead of HO, but it is preferably to have such position HO for providing the head protecting means KP for securing, capping and cleaning the head or for conducting the head recovery in the case of ink emission failure.

The returning operation of the carriage CA to the stop position HO is achieved, in a similar manner as in the power turning-on step, by maintaining the signal line l2 at the level "0" for a determined period thereby resetting the flip-flop F1, clearing the column counter PC, line counter 7C, timing pulse separating circuit TB and back counter BC through the gate AR and activating the one-shot multivibrator OS. Then a level "1" signal is supplied to the gate ST through the signal line lR thereby allowing the entry of the output from the clock pulse generator CPG into the counter only when the signal $\overline{TP}$ is at the level "1". In this state the gate BG is closed through the inverter IR, so that the back counter BC is not in function.

Thereafter the control CC maintains the signal lines lF and lB respectively at the level "0" and the level "1" to activate the coil C thereby causing the backward motion of the carriage, during which the counter SC repeats the counting of output pulses of the clock pulse generator CPG and the resetting in response to each timing pulse. Upon arrival of the carriage at the position HO shown in FIG. 5, the counter SC produces a signal indicating the completion of counting of a determined time to the signal line lS, in response to which the control CC, identifying the carriage displacement to position HO, shifts the signal line lB to the level "0" thereby deactivating the coil C to stop the carriage CA at position HO, and also shifts the signal line lR to open the gate ST, thereby opening the gate BG through the inverter IR. During these steps, the paper feed driver PFD is activated through the signal line l8 to perform the paper feed operations three times to complete the printing.

The aforementioned position HP is a position at which the carriage CA is finally stopped by the forward drive, after the inertial displacement thereof following the coil deactivation in response to the completion of counting of all the timing pulses by the back counter BC.

Figure 9:
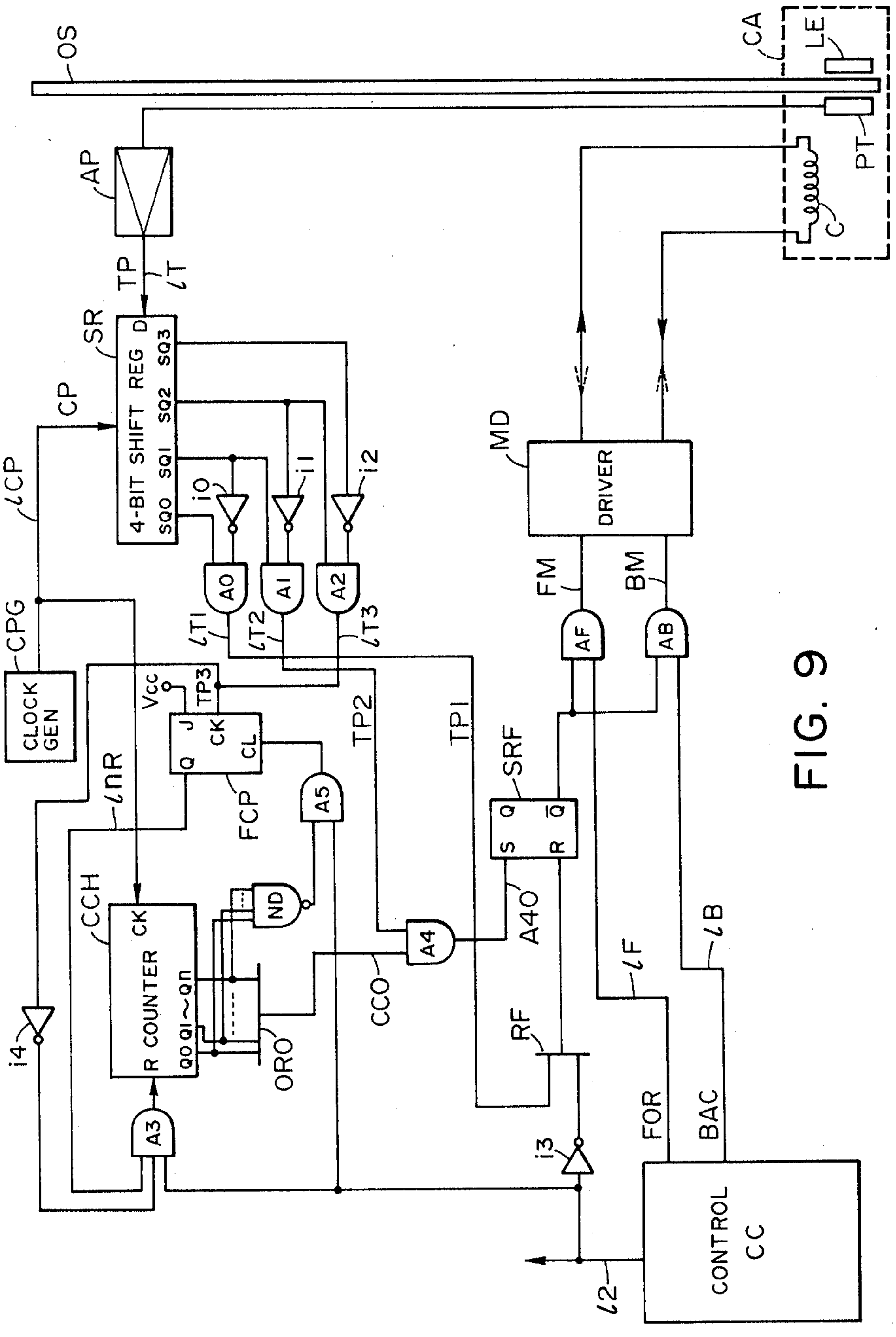
FIG. 9 is a schematic circuit diagram of an embodiment of speed control circuit.
Figure 10:
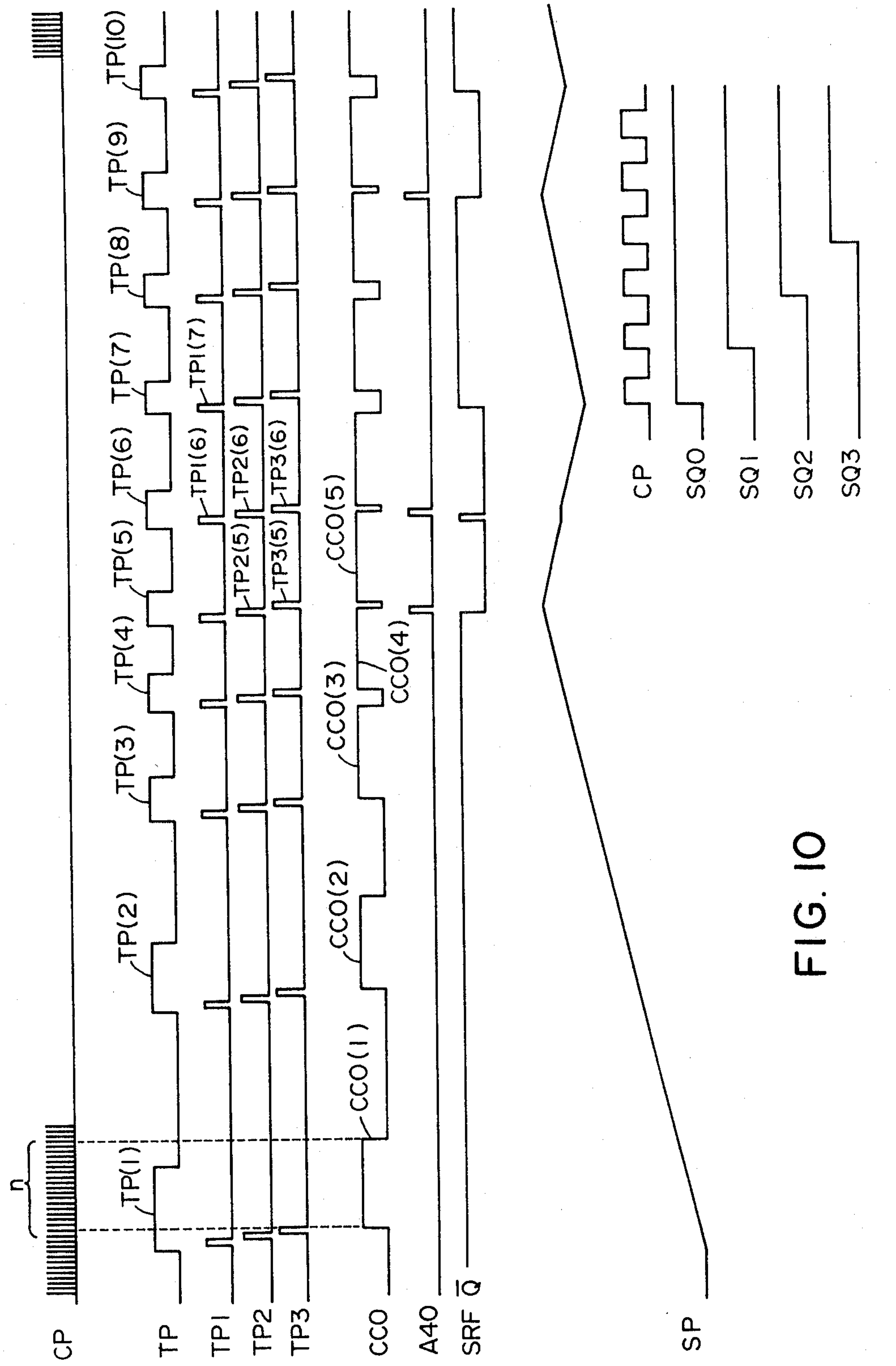
FIG. 10 depicts waveforms useful for understanding the operations of the circuit.

FIG. 9 shows in detail the carriage speed control SC shown in FIG. 4, of which the timing chart is also shown in FIG. 10. In FIG. 9, the signals optically sensed by the detecting means LE and PT in response to the displacement of the carriage CA over the slit plate OS are supplied through the amplifier AP as timing pulses TP to the signal line lT.

In response to timing pulse TP, the outputs Q0, Q1, Q2 and Q3 of a 4-bit shift register SR are set in succession by the clock pulses CP from the clock pulse generator CPG, whereby output signals TP1, TP2 and TP3, respectively representing the logical products of the signal Q1 inverted by an inverter i0 and the signal Q0, of the signal Q2 inverted by an inverter i1 and the signal Q1 and of the signal Q3 inverted by an inverter i2 and the signal Q2 are supplied to the signal lines lT1, lT2 and lT3 through AND gates A0, A1 and A2. Signals TP1–TP3 are shown in FIG. 10. The signal TP1 supplied through the line lT1 resets the flip-flop SRF through an OR gate RF, and the signal TP2 supplied through the line lT2 opens the gate A4 during the duration thereof.

Also the signal TP3 supplied to the line lT3 sets the flip-flop FCP to supply an output signal to an AND gate A3 whereby a counter CCH is reset through an inverter i4 when the signal TP3 assumes the level "1" and starts counting of the clock pulses CP supplied from the signal line lCP when the signal TP3 assumes the level "0".

At the start of printing the signal line l2 is shifted to level "0" for a determined duration to reset the counter CCH through gate A3 and also reset the flip-flop FCP through a gate A5, of which level "0" output signal is supplied through the signal line lnR to the gate A3 to continuously reset the counter CCH until it is set by the signal TP3. The counter CCH is released from the resetting to initiate the counting when the signal TP3 assumes the level "1" state to set the flip-flop FCP and then assumes the level "0" state, and the flip-flop remains in the set state until the end of counting as all the outputs Q0–Qn of the counter CCH are supplied through a NAND gate ND. Thus, when the counter CCH completes the counting up to a number n, the NAND gate ND develops the level "0" signal to reset the flip-flop FCP and thus the counter CCH.

Also the flip-flop SRF is reset by the aforementioned signal line l2 through an inverter i3 and an OR gate RF to enable AND gates AF and AB. Referring to FIG. 9, in response to a timing pulse TP(1) pulse signals TP1, TP2 and TP3 are developed, and pulse signal TP3 sets the flip-flop FCP whereby the counter CCH counts to a determined number to provide output signals to the ports Q0–Qn, whereby, during said counting, an OR gate OR0 provides a level "1" signal through the signal line CCO to the AND gate A4.

The other input terminal of AND gate A4 receives through a signal line lT2 the signal TP2 prepared from the timing pulses TP, which are generated through the displacement of the carriage CA as explained before and of which the timing and duration are therefore related to the carriage speed. Consequently in the case of a low carriage speed giving a timing pulse as represented by the TP(1) in FIG. 10, the signal TP2 is not developed during the counting operation of the counter CCH to maintain the gate A4 closed, whereby the flip-flop SRF remains in the reset state caused by the signal TP1 through the OR gate RF supplied prior to signal TP2. As these functions do not affect the AND gates AF and AB, the carriage CA remains in the driven state.

Also in response to the timing pulses TP(2), TP(3) and TP(4) the coil C continues the carriage drive as the gate A4 does not transmit the logic product of the counter output CCO and the signal TP2, but the carriage speed increases progressively due to continued driving, whereby the interval of the timing pulses becomes shorter. In response to the succeeding timing pulse TP(5), the gate A4 transmits the logical product of the output signal on the line CCO(4) through the gate ORO and the timing pulse TP2(5) to set the flip-flop SRF through a signal line A40.

Upon the setting the flip-flop SRF changes the output $\overline{Q}$ thereof from the level "1" to "0" to disable the AND gates AF and AB, whereby the driver MD is deactivated to terminate the drive for the coil C. Thereafter the carriage continues to displace by inertia, with progressively decreasing speed. In response to the succeeding pulse TP3(5) the counter CCH is reset through the inverter i4, and the flip-flop FCP is set at the trailing edge of pulse TP3(5) to restart the counting by counter CCH. Then, in response to the signal TP1(6) generated by the succeeding timing pulse TP(6), the flip-flop SRF is reset through the gate RF, whereby the gates AF and AB are opened by the output signal $\overline{Q}$ thereof to restart the drive for the coil C.

Although the carriage speed is reduced by the interrupted coil driving between the signals TP2(5) and TP1(6), in response to the timing pulse TP(6) where the carriage speed is not excessively reduced, the gate A4 transmits the logical product of the output signal of the counter CCH from the output port CCO(5) thereof and the signal TP2(6) in a similar manner as in the foregoing pulse TP(5) to again set the flip-flop SRF, whereby the gates AF and AB are disable to terminate the coil driving until the receipt of the signal TP1(7) in response to the timing pulse TP(7).

Also, as discussed in the foregoing, the counter CCH is reset by the signal $\overline{\text{TP3(6)}}$ and restarts the counting upon setting of the flip-flop FCP at the trailing edge of the signal TP3(6).

Further, in response to the signal TP1(7) generated by the succeeding timing pulse TP(7), the flip-flop SRF is reset through the gate RF, whereby the gates AF and AB are enabled to restart the coil drive.

Thereafter the coil drive is conducted by the logical product of the signal TP2 and the counter output signal CCO, and the coil drive is not interrupted in response to the timing pulses TP(7) and TP(8) but in response to the timing pulse TP(9) as in the aforementioned case of timing pulses TP(5) and TP(6), whereby the carriage speed is controlled by the clock pulse counting by the counter CCH.

What we claim is:

1. A recording apparatus comprising:
an elongated permanent magnet disposed perpendicular to a direction in which a recording paper is advanced;
a guide member of magnetic material disposed in parallel relation to said permanent magnet;
a carriage slidably movable along said guide member;
a coil mounted on said carriage and arranged to surround said guide member;
an ink nozzle mounted on said carriage;
a plate member of non-magnetic material having a plurality of slits, said plate member being surrounded by at least three internal faces of said carriage and being disposed in parallel with said permanent magnet; and
a light emitting and receiving element mounted on said carriage for detecting with the slits of said plate member each position of said carriage.

2. A recording apparatus according to claim 1, further comprising means for detecting the speed of said carriage in accordance with a signal from said light emitting and receiving element.

3. A recording apparatus according to claim 1, wherein said carriage has a print board mounted thereon for coupling said coil, said ink jet nozzle and said light emitting and receiving element.

4. A recording apparatus according to claim 1, further comprising a protective means for covering said ink jet nozzle.

5. A recording apparatus according to claim 1, further comprising means responsive to a signal from said light receiving element for controlling said coil and said ink jet nozzle on said carriage to perform serial printing by an ink jet.

6. A recording apparatus comprising:

a linear motor having a permanent magnet;

a carriage movable by said linear motor along a path;

a coil mounted on said carriage, for moving said carriage in conjunction with said linear motor;

a recording element mounted on said carriage, for effecting dot-recording on a recording paper;

a plate associated with and extending along the path of movement of said carriage, said plate composed of a nonmagnetic material and having a plurality of slits;

a light emitting and receiving element mounted on said carriage, for detecting with said plurality of slits each position of said carriage; and means for controlling the movement of said carriage, including:

means for supplying said recording element with recording information;

means for discriminating, when said supply means has supplied said recording element with a piece of recording information, the presence or absence of a next piece of recording information; and means for moving, when said discriminating means discriminates the absence of the next piece of recording information, said carriage in one direction to a home position of said carriage, and for reversing, when said discriminating means discriminates the presence of the next piece of recording information, the direction of movement of said carriage just before it reaches the home position.

7. A recording apparatus according to claim 6, further comprising means for detecting a speed of said carriage from a signal derived from said light emitting and receiving element to stabilize the speed of movement of said carriage.

8. A recording apparatus according to claim 6, wherein said recording element includes an ink jet nozzle, and, at the home position of said carriage, said recording element is provided with means for protecting said ink jet nozzle.

9. A recording apparatus according to claim 6, wherein said permanent magnet is positioned perpendicular to a direction of advancement of the recording paper, and said linear motor includes a shaft composed of magnetic material and disposed in a direction parallel to said permanent magnet, said coil is mounted on said carriage to surround said shaft so that said carriage moves in conjunction with said linear motor.

10. A recording apparatus according to claim 6, wherein said plate is surrounded by at least three internal faces of said carriage.

* * * * *